H. L. ROBERTS.
PAMPHLET COVERER.
APPLICATION FILED JAN. 7, 1916.

1,205,023.

Patented Nov. 14, 1916.
8 SHEETS—SHEET 3.

WITNESSES

INVENTOR
Horace L. Roberts
BY
ATTORNEY

H. L. ROBERTS.
PAMPHLET COVERER.
APPLICATION FILED JAN. 7, 1916.

1,205,023.

Patented Nov. 14, 1916.
8 SHEETS—SHEET 6.

H. L. ROBERTS.
PAMPHLET COVERER.
APPLICATION FILED JAN. 7, 1916.

1,205,023.

Patented Nov. 14, 1916.
8 SHEETS—SHEET 8.

WITNESSES:

INVENTOR
Horace L. Roberts
BY
ATTORNEY

UNITED STATES PATENT OFFICE.

HORACE L. ROBERTS, OF BROOKLYN, NEW YORK.

PAMPHLET-COVERER.

1,205,023.

Specification of Letters Patent.

Patented Nov. 14, 1916.

Application filed January 7, 1916. Serial No. 70,747.

*To all whom it may concern:*

Be it known that I, HORACE L. ROBERTS, a citizen of the United States, and a resident of Brooklyn, in the county of Kings and State of New York, have invented certain new and useful Improvements in Pamphlet-Coverers, of which the following is a specification.

This invention relates to a pamphlet coverer of novel construction by means of which a pamphlet or book body is provided with a paper cover in a quick and reliable manner. The machine is supplied with covers that are furnished with a ribbon of paste extending along a scored back and likewise a short distance to the right and left of the back. These covers are fed into the end of a runway in such a manner that the back is received within said runway while the sides project to the right and left thereof. Into the receiving end of said runway is likewise fed, sidewise, the upright body of the pamphlet, which is here supported at a distance above the cover. Both the cover and the pamphlet are now separately advanced along the runway, the cover being, during this advance movement, likewise raised, so as to eventually contact with the back of the pamphlet to which it will thus become attached by the ribbon of adhesive. The separate cover-feeding means thus becoming unnecessary, a further forward movement is imparted to the pamphlet, in which movement the cover will participate owing to its connection therewith. This forward movement will carry the pamphlet into engagement with a pair of folders, that will turn the cover upward, and with a plurality of pressure rollers by means of which the cover is firmly forced against the sides of the pamphlet, so as to become attached thereto, for some distance beyond the back. After passing the pressing rollers, the pamphlet will be attacked by a pair of flanged rollers, which score the sides of the pamphlet along lines at or about the edges of the paste ribbon, the pamphlet being, during its engagement with the folders, pressing rollers and scoring rollers, forced tightly down against the back of the cover by means of a set of obliquely hung depressing rollers. The pamphlet being now substantially finished is further fed along the runway and upon a gate or trap door, on the withdrawal of which it will fall squarely upon a delivery platform, the impact of the back of the pamphlet with the platform, causing a final flat finish of the back to be insured. On the delivery platform, the pamphlets are stacked up ready for removal.

In the accompanying drawing.

Figures 13, 17:
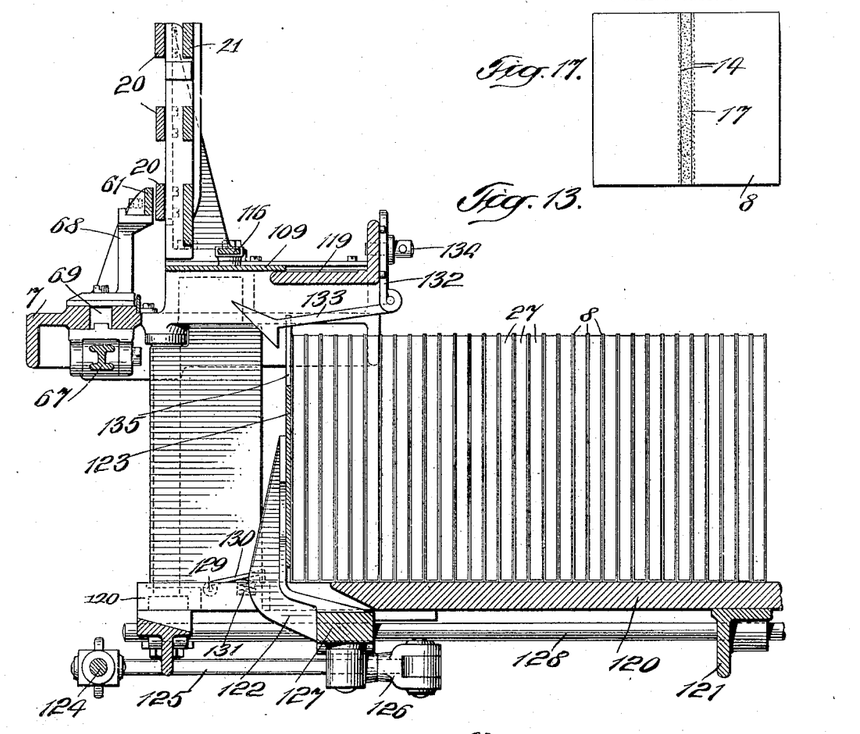
Fig. 13 is a section on line 13—13 Fig. 2.
Fig. 17 is a detail showing the cover supplied with a scored back and paste ribbon.

The frame 6 of the machine (Fig. 1) has a table 7, upon which a stack of covers 8 is placed within a magazine 9. These covers are successively withdrawn from the bottom of the stack by a combing wheel 10 intermittently operated in suitable manner by a tripping device 11, which is adapted to be engaged by the tail of the advancing sheet. After being thus withdrawn from the stack, the cover is further fed along the table by a series of rollers 12 and other suitable means which carry the same beneath a pair of flanged wheels 13 that score the cover along its back as indicated at 14 Fig. 17. Next, the cover passes underneath a paste pot 15 into which projects one of a pair of paste rollers 16 by means of which an adhesive ribbon 17 is formed on the cover. This ribbon extends not only along the back of the cover, or between the scored lines 14, but also some distance beyond said lines, so that the ribbon is adapted to secure the cover to the pamphlet, at the back as well as at the sides some distance beyond the back. The cover is now further advanced between rollers 18 and thus carried toward and into the receiving end of a runway 19, which extends longitudinally along the machine table and is of a width to accommodate the back of the cover, while the sides of the cover project laterally beyond the same.

Figure 2:
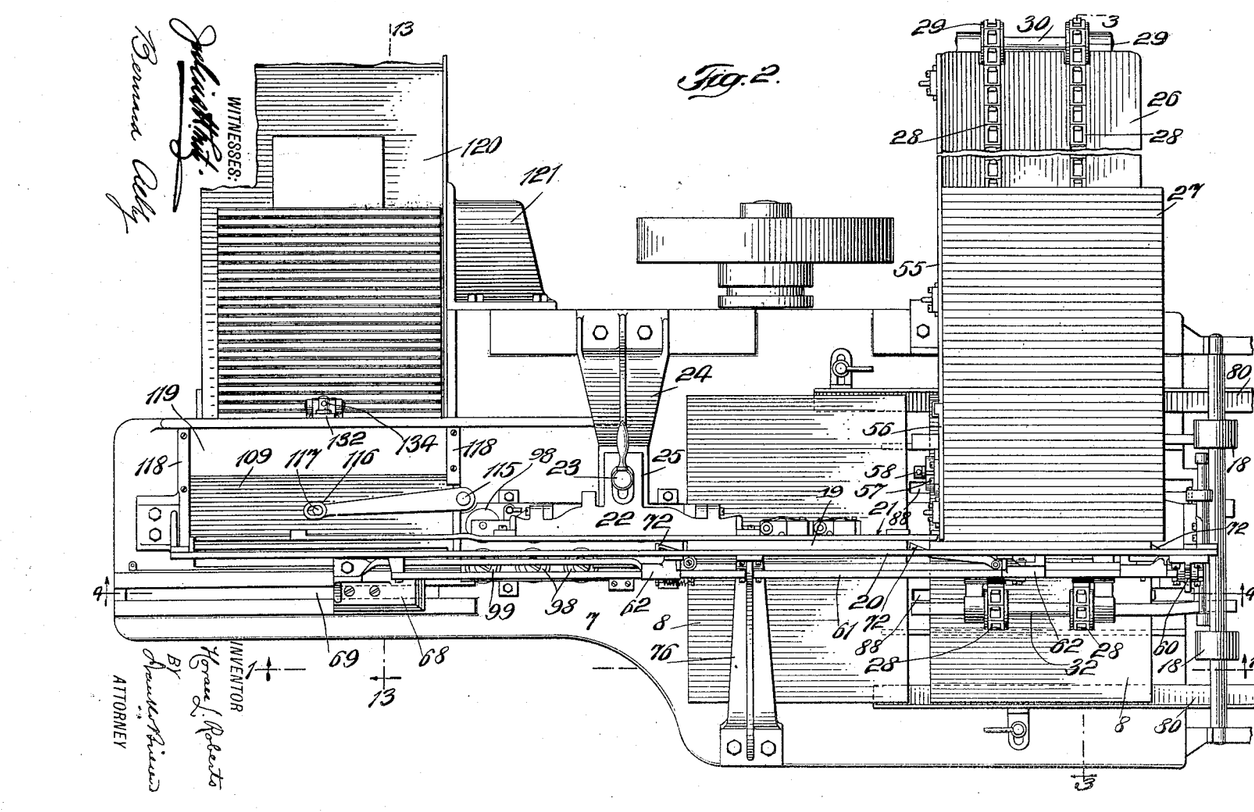
Fig. 2 is a plan with the sheet feeding, pasting and creasing devices omitted.

The feeding, scoring and pasting devices thus far described, do not form part of the present invention and may be embodied in a separate machine, the invention to which the present application relates pertaining to a machine into which the scored backs carrying the adhesive ribbons are delivered. The runway 19 (Fig. 2) is formed by a fixed side piece 20, and a parallel adjustable side piece 21, by means of which the width of the runway may be set to books of different thicknesses. Each side piece is formed of a number of upright posts, and a number of spaced horizontal rails carried by said posts. The adjustable side piece 21 is shorter than the fixed side piece at the receiving end of the runway, for an extent sufficient to allow the body of the pamphlet, to be fed sidewise into the runway in manner hereinafter described. In order to adjust side piece 21, it is furnished with a slotted projection 22 engaged by a clamp screw 23, tapped into a fixed bracket 24, while guides 25 on the bracket that engage the sides of projection 22, serve to insure a proper rectilinear movement of the side piece 21, in parallelism with side piece 20.

Figure 3:
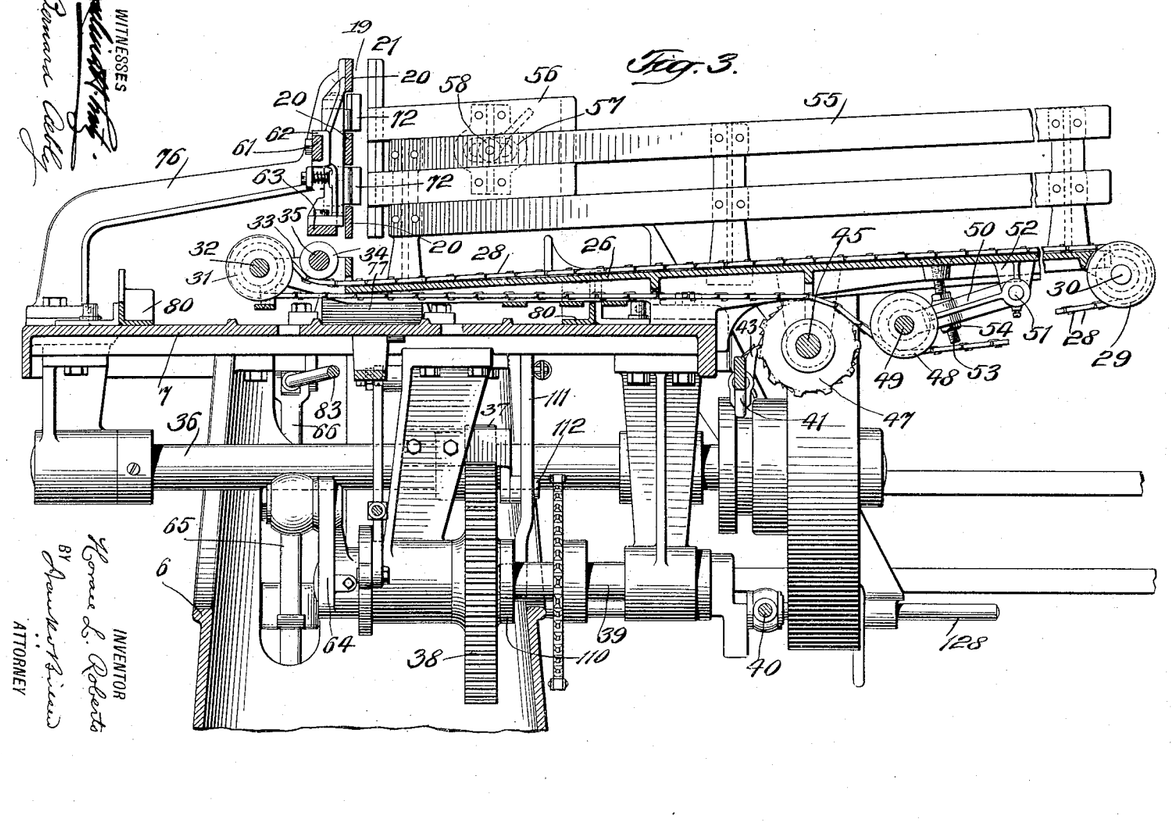
Fig. 3 is a section on line 3—3 Fig. 2.
Figure 4:
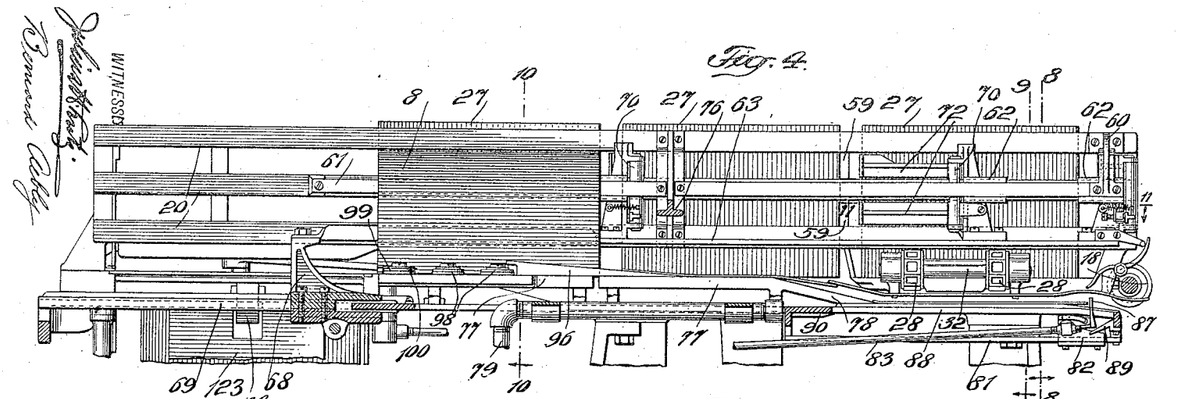
Fig. 4 is a section on line 4—4 Fig. 2.
Figures 6, 7:
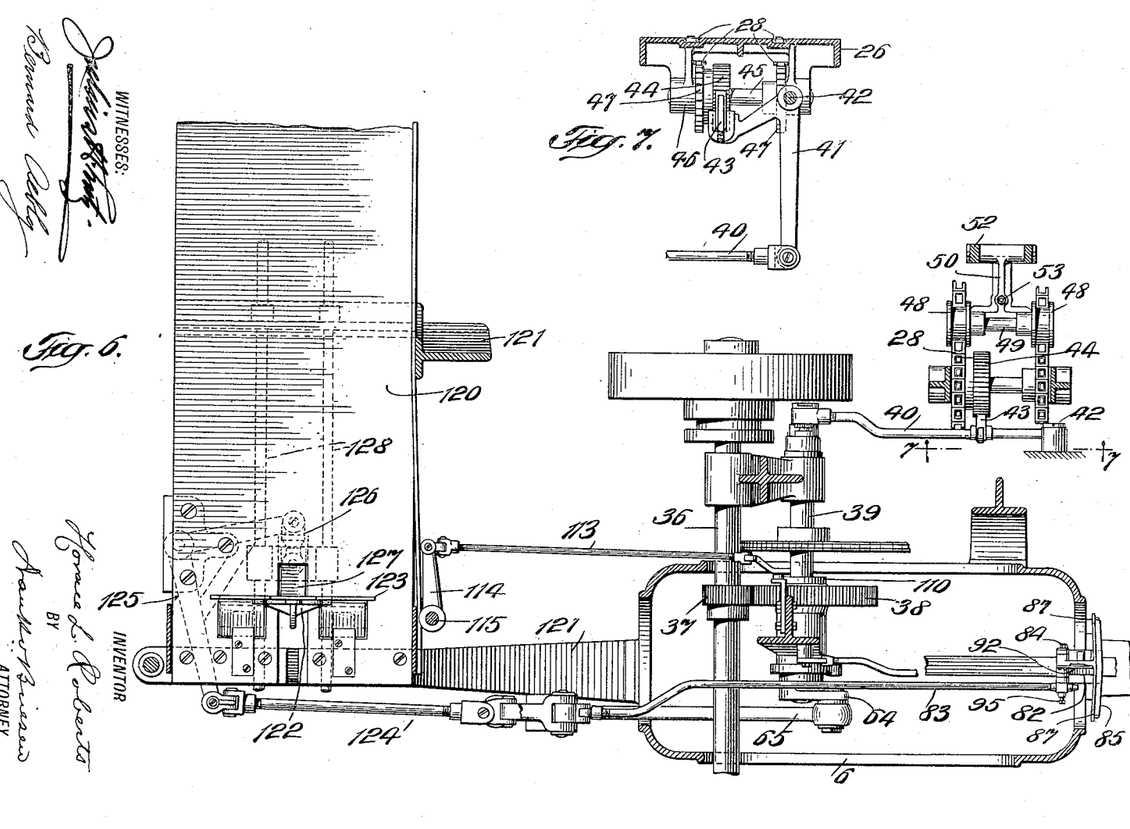
Fig. 6 is a horizontal section on line 6—6 Fig. 1.
Fig. 7 is a section on line 7—7 Fig. 6.
Figure 8:
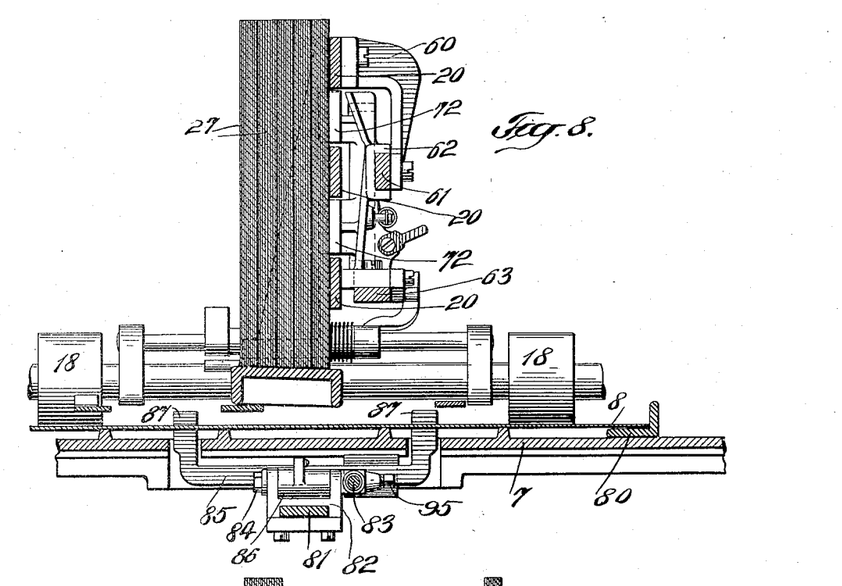
Fig. 8 is a section on line 8—8 Fig. 4.

The bodies of the uncovered pamphlets are fed into the runway in the following manner: At its receiving end, table 7 is provided with a laterally extending platform 26 (Figs. 2 and 3), upon which a stack of uncovered pamphlets 27 may be placed. This platform projects over part of the table and across the runway 19, up to the side piece 20 so as to here constitute in effect a false bottom, while there is formed a clearance beneath the false bottom, by which the covers are accommodated. The pamphlets are set upon the platform in an upright position, with their backs downward and their heads directed to the right, the foremost pamphlet projecting into the runway and resting against the protruding portion of side piece 20. In order to compensate for the difference in thickness between the backs and fronts of the pamphlets, the platform is set at an inclination or downward dip, so that the fronts of the pamphlets will be subjected to an even surface pressure, while moving into the runway. The pamphlets are intermittently advanced along platform 26 at right angles to the runway, by means of a pair of endless conveyer chains 28, the upper runs of which protrude slightly above the surface of the platform. Chains 28 pass at one end over idlers 29, fast on a shaft 30, journaled in the outer end of platform 26, while at their other end they pass over idlers 31 fast on a shaft 32 which is journaled in a bearing 33, carried by the platform, at a point beyond side piece 20, so that in this way, the chains traverse the runway, and will feed the pamphlets against the inner face of side piece 20. Rolls 34 mounted on a shaft 35, which is likewise journaled in bearing 33, serve to hold the chains at their proper distance off the surface of platform 26. Intermittent movement is imparted to chains 28 from power shaft 36 by gear wheels 37, 38 and crank shaft 39 (Figs. 6 and 7), which by rod 40 is connected to a bell crank 41 fulcrumed at 42 to table 7. To bell crank 41 is pivoted a pawl 43, engaging a ratchet wheel 44 fast on a shaft 45, journaled in bearings 46 of platform 26. This shaft likewise carries a pair of sprocket wheels 47, that engage chains 28, so that in this way, the desired intermittent motion is imparted to the latter. Idlers 48, mounted on a shaft 49 which is journaled in a bracket 50 pivoted at 51, to bearings 52 of platform 26, serve to take up any slack in chains 28. Bracket 50 may be adjusted by a screw stud 53, tapped into platform 26 and passing through an opening of the bracket to which it is held by nuts 54. By setting the bracket, the tension of the chains, and consequently the hold of sprocket wheels 47 on the chains may thus be regulated.

While the pamphlets are being fed along platform 26, their tails engage a gage 55 (Fig. 2) which extends up to the end of side piece 21 with which it forms a corner. This gage carries an adjustable extension 56 adapted to be projected more or less across runway 19, so as to adapt the latter for the reception of thicker or thinner pamphlets, the extension having an elongated slot 57, that receives a binding screw 58, tapped into gage 55. When the foremost pamphlet has entered the runway, the foremost cover 8, will by rollers 18, have been fed along table 7, to such a position that the center line of the cover will coincide with that of the pamphlet, the cover being in this position, partly accommodated by the clearance formed between table and platform. After being so positioned, the pamphlet and the cover are separately advanced to a meeting point where they will become connected, by the paste carried on the cover, the pamphlet to which the cover has thus become attached, is further advanced along the runway, the cover is turned up, pressed toward the sides of the pamphlet and scored along such sides while finally the pamphlet is delivered on a trap door, upon the recession of which, it is dropped on to a delivery platform upon which the pamphlets are stacked awaiting removal.

Figure 11:
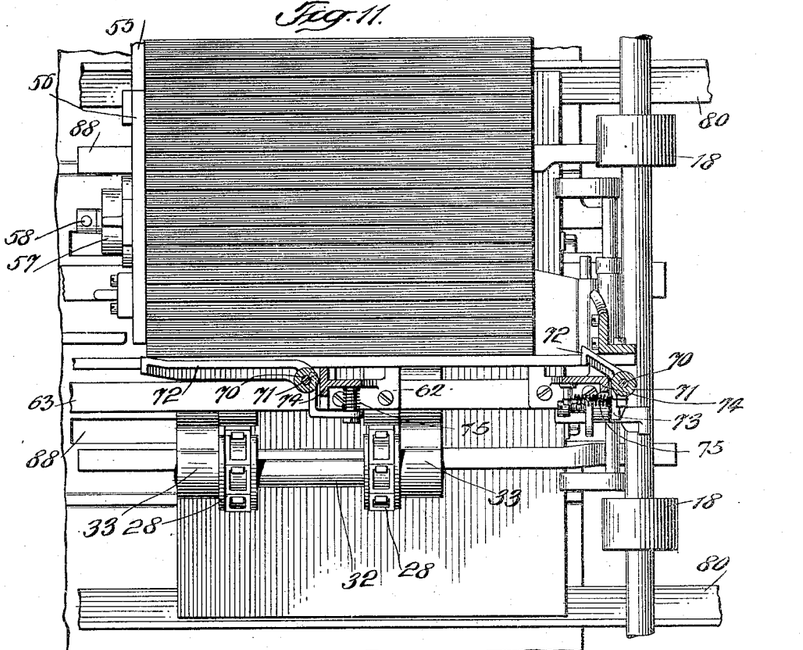
Fig. 11 is a section on line 11—11 Fig. 4.
Figure 12:
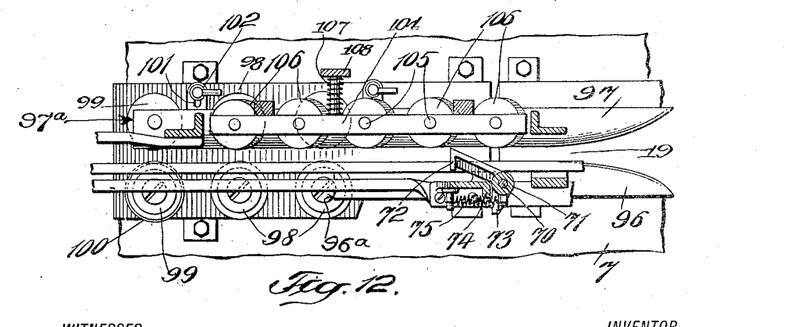
Fig. 12 is a detail section of the pressure rollers.

The means for feeding the pamphlets within the runway to their meeting point with the covers are as follows (Figs. 3, 4, 5, 6, 8, 9, 11, and 12): Side piece 20 is composed of three flat bars forming a pair of longitudinal openings 59 therebetween. To side piece 20 is attached by brackets 60, a longitudinal guide rail 61 extending along the principal part of the runway. This rail is engaged by a plurality of cross heads 62 three of which are shown in the drawing. The cross heads are connected to each other by a rod 63 to which reciprocating motion is shown to be imparted in the following manner: A crank 64 on shaft 39 by rod 65, oscillating arm 66, and rod 67, reciprocates a cross head 68 along grooved ways 69 of table 7. To cross head 68 is attached rod 63, which is thus reciprocated to impart a corresponding movement to cross heads 62. Each cross head 62 is furnished with a pintle 70, that is engaged by the knuckle 71 of a pusher or book-feeding member 72 which is forked and projects into runway 19, through upper and lower openings 59 respectively. The pushers are provided with lugs 73 (Figs. 11 and 12) adapted to engage fixed abutments 74, against which they are drawn by springs 75, which thus tend to project the pushers partly across the runway 19. As shown, the central pusher is made somewhat longer than the end pushers (Fig. 2), which is for the purpose of permitting the central pusher to pass a bracket 76, by which the side piece 20 is attached to table 7.

Figures 14, 16:
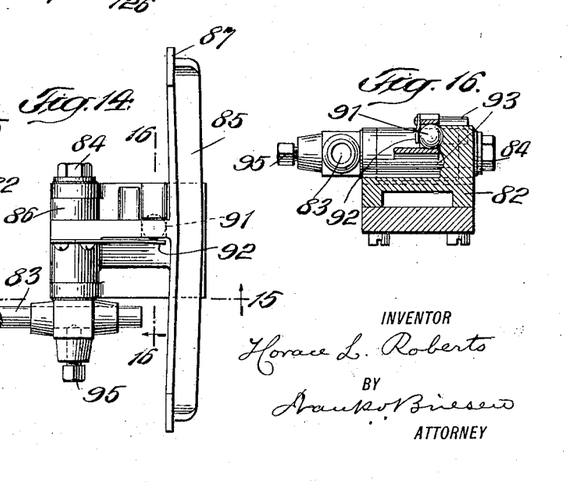
Fig. 14 is a detail plan of the cover-feeding means.
Fig. 16 is a section on line 16—16 Fig. 14.
Figure 15:
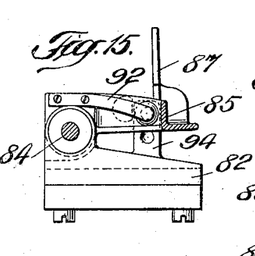
Fig. 15 is a section on line 15—15 Fig. 14.

While the pamphlet is carried forward along the runway by the first pusher, the cover which had previously been placed underneath the pamphlet and below the overhung portion of platform 26, is fed forward and upward to meet the pamphlet, and to become attached thereto in the following manner (Figs. 4, 5, 8, 11, 14, 15): Along the bottom of runway 19, there extends a bridge or support 77 having an inclined section 78 which starts underneath platform 26, so as to leave a clearance therebelow, and thence rises to a level with the platform. The bridge is made in two parts, the forward section of which may be heated by gas or electricity as at 79, while its rear section is to remain cold. A pair of adjustable guides 80 having like inclined sections, flank bridge 77, and together with said bridge constitute the support for the cover on which it is pushed by rollers 18. Means are provided for feeding the cover along bridge 77 and guides 80, so that by the inclined portions thereof, it is raised into contact with the pamphlet, as the latter is carried forward by the first pusher. These means are as follows: Along the bottom of table 7, there extends a guide rail 81 upon which a cross head 82 is moved by a connecting rod 83, actuated from oscillating arm 66. To cross head 82 is pivoted by pin 84, the shank of a T shaped pusher or cover feeding member 85, having a hub 86 that is adapted to oscillate on the pin. The pusher is provided with a pair of upwardly projecting fingers 87, that are adapted to be projected above the level of table 7 through a pair of longitudinal slots 88 formed in said table between bridge 77 and guides 80. At opposite ends of the raceway of cross head 82, there depend from table 7, a pair of tappets 89 and 90 which are adapted to engage the cross arm of pusher 85. The right hand tappet 89 has an upper operative bevel which is adapted to swing the pusher upward on fulcrum 84, while the left hand tappet 90 has a lower operative bevel, which is adapted to swing the pusher down. Thus during the reciprocating movement of cross head 82, the pusher will be alternately raised above the surface of the table at the right or receiving end of the machine and depressed beneath such surface at the delivery end, so that after having performed its function of feeding the cover forward, it will disappear and not interfere with the next incoming cover. In order to hold the pusher in the position into which it is swung by the tappets, it is provided with a brake which is shown to be formed of a ball 91 (Figs. 14, 15, 16) movably housed within the shank of the pusher, and adapted to be projected by a spring 92 into either an upper or a lower socket 93 formed within a boss 94 which extends upwardly from cross head 82. The cross head 82 is adjustably secured to the rod 83 by a set screw 95, so that by setting the cross head to the right or left, the cover may be made to project either beyond the head or tail of the pamphlet, as is sometimes desired.

Figure 5:
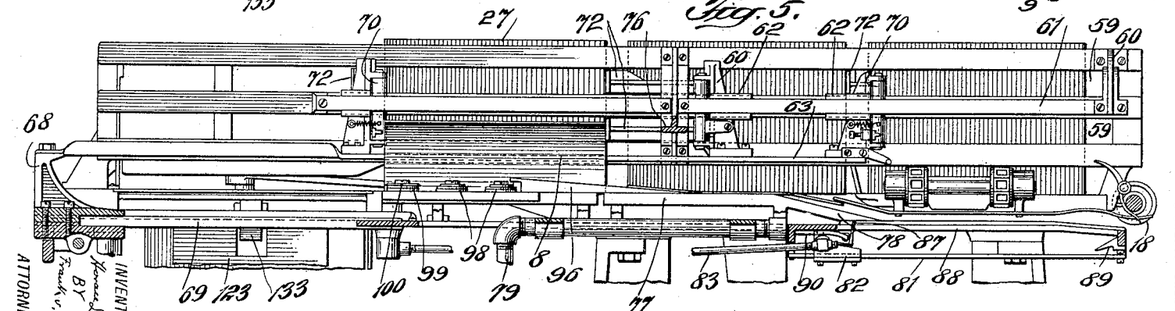
Fig. 5 is a similar section showing the parts in a different position.
Figures 9, 10:
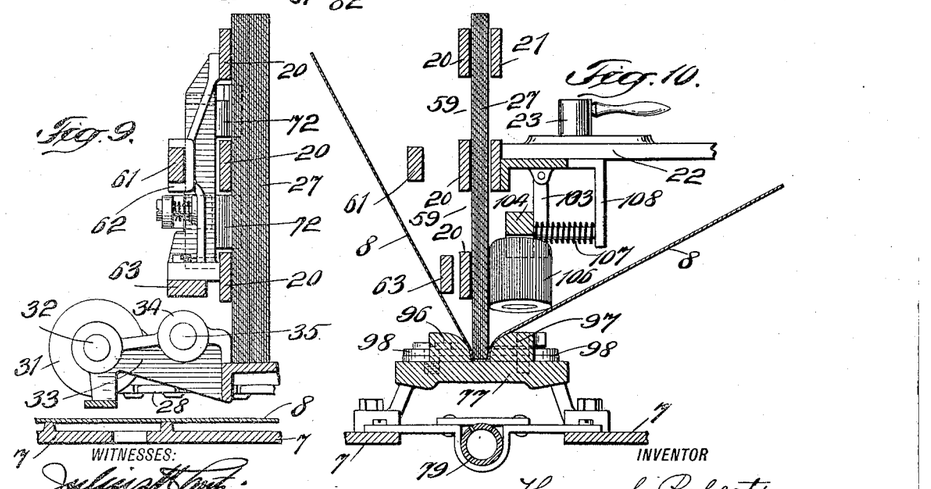
Fig. 9 is a section on line 9—9 Fig. 4.
Fig. 10 is a section on line 10—10 Fig. 4.

In use, the pamphlet is by the first pusher 72, separated from the pile and advanced along the runway, the back of the pamphlet being level with the upper level of the bridge 77. The cover 8 is simultaneously advanced by pusher 85 and raised by the inclined section 78 of said bridge so that it will meet the pamphlet, and become connected thereto along its back by the adhesive ribbon on the cover. The pamphlet with the cover thus attached, is now fed by the first pusher 72 a short distance along the runway when, owing to the reciprocating movement of rod 63, it will be released from said first pusher and become engaged by the second pusher, to be by the latter, fed along a further stretch of the runway where it is folded and scored in the following manner: To the cold part of bridge 77 are secured on opposite sides of runway 19, a pair of folders 96, 97 which are more fully illustrated in Figs. 5, 10 and 12. Each folder has a gradual rise from its right or ingress end, where it is flush with the surface of the bridge, toward its left, where it extends a substantial distance above the bridge as indicated in Fig. 5. The inlet ends of the folders are made flaring, to form a mouth therebetween while the inner sides of the folders are rounded and gradually increase in steepness, so that the cover which projects with its sides through the openings of the side pieces will by the folders, be gradually lifted and folded upward toward side pieces 20 and 21 and consequently toward the sides of the pamphlet, as shown in Fig. 10. With the construction described, the folder 96 is attached directly to bridge 77, and overhangs at its delivery end, the first of a row of horizontal rollers 98, 99 which turn on upright studs tapped into one side of the bridge. The rollers 98, 99 project to a slight extent into runway 19, beyond the inner face of side piece 20, so as to engage the sides of the pamphlet directly above its back. The rollers 98 have plain faces, and serve as pressing members, by which the cover is combed up against the sides of the pamphlet, to a height defined by the thickness of the rollers. The roller 99, however, has an upper circumferential sharp flange or edge 100, which may be formed either in one piece with the roller or in the form of a separate disk. This flange constitutes a scoring member, by means of which the covers are scored along the sides of the pamphlet, directly above the pasted portions thereof so as to insure a hinge-like motion of the covers during use, and prevent the covers from becoming more or less detached from the pamphlet below the scoring line. The rollers 98, 99 are made removable, so that they may be replaced by higher or lower rollers, whenever it is desired to change the location of the scoring line.

The folder 97 is made adjustable so that it may be set to pamphlets of different thicknesses, for which purpose it is furnished with a pair of lugs 101 having elongated slots that are engaged by binding screws 102 tapped into bridge 77. Folder 97 is somewhat longer than folder 96, and carries at its protruding end, a row of rollers 98, 99 (Fig. 12), which will thus participate in the adjustment of the folder, the end of folder 97 being indicated by arrow 97$^a$, while the end of folder 96 is indicated by arrow 96$^a$. Rollers 98, 99 correspond in all respects to the rollers of folder 96, with which they are mated, the rollers 98 being plain and constituting pressing members, while the roller 99 is flanged to constitute a scoring member as previously described.

Figure 1:
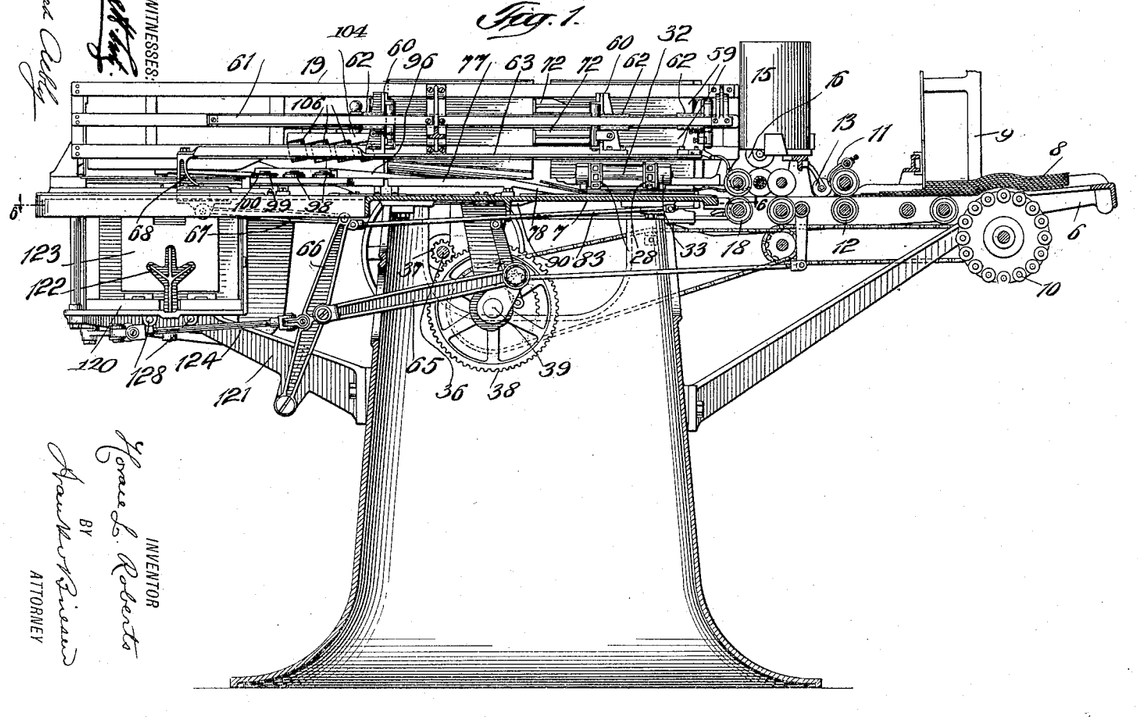
Figure 1 is a longitudinal section of a pamphlet coverer embodying my invention on line 1—1 Fig. 2.

Means are provided, which, while the pamphlet is undergoing its folding and scoring operation, subject it to a downward thrust, whereby the back of the pamphlet is forcibly held against the cover, so that a perfect contact with the adhesive ribbon and a proper engagement of the cover with the pressing and scoring rollers is insured. To effect this downward pressure there is hinged to projection 22 by arms 103, a bar 104 (Figs. 1, 10, 12) which is arranged in substantial parallelism with the runway. The bar has a lower stepped face, and into each step is tapped a stud or shaft 105, carrying a milled depressing roller 106 that protrudes into the runway (Fig. 10). The steps of bar 104 are inclined downwardly from right to left, and as the studs 105 are tapped into the bar at right angles to the steps, such studs and consequently the rollers 106 will assume a corresponding incline to the vertical (Fig. 1). The rollers are forced against one of the sides of the pamphlet, by means of a spring 107, which is interposed between bar 104, and a tail piece 108 depending from projection 22. As the pamphlet is carried along the runway, it will be subjected to the action of the successive rollers, each of which, owing to its dip will have a tendency to force the pamphlet downward or against the cover, the effect of the entire row of rollers which is located above the folder 97 thus being to insure a tight contact between pamphlet and cover during the entire folding and scoring operation. Between folder 97 and the rollers 106, there is formed a clearance which permits the corresponding portion of the cover to pass outwardly therebetween (Fig. 10).

The second pusher 72 will advance the pamphlet into engagement with folders 96, 97 after which it will become engaged by the third pusher, which will feed it along the folding and scoring devices, and onto a trap door located above the delivery end of the machine (Figs. 2, 3, 6, 13). The bridge 77 terminates directly back of the scoring rollers 99, from which point, on, the runway becomes bottomless, for a distance greater than the length of a pamphlet. This rear open section or delivery end of the runway, is provided with a horizontally slidable gate or trap door 109, which is projected sidewise over the runway so as to close the same, when the pushers 72 are receding or moving to the right, and is withdrawn from the runway so as to open the same when the pushers have completed their forward movement to the left. In this way, the foremost pamphlet will be placed upon the gate, and when the latter opens subsequently, the pamphlet will drop squarely through the runway, upon the delivery platform of the machine which is located a distance below table 7. The gate 109 is operated from shaft 39 by cam 110, lever 111 fulcrumed at 112, rod 113, and bell crank 114, mounted on a pivot 115 and having an elongated eye 116 that is engaged by a stud 117 on the gate. The gate is guided in ways 118, and when retracted is supported upon a shelf 119 which is formed integral with table 7. The side piece 21, is at its delivery end flared slightly outward, so as to here increase the width of the runway, and give the pamphlet more elbow room, above the gate across the path of which the side piece 21 projects, to here form a stripper. Thus, when the gate is retracted in manner hereinbefore described, the pamphlet which has been pushed upon the same, will by the side piece 21, be stripped off, so that it will retain its parallelism with the runway, while dropping through the opening of the table 7.

At a clearing distance below the table, (when the pamphlet is standing in an upright position) the machine is provided with a laterally extending delivery platform 120 which is secured to the machine frame by brackets 121. The drop of the pamphlet upon this platform, in a vertical direction, and with its back bottommost, will subject such back to a violent impact with the platform, which assists in imparting the desired flat surface to the back. The inner end of platform 120 is slotted for the accommodation of the protruding arm 122 of a sliding plate 123 which extends across the platform, and has a limited reciprocal movement along the same. This movement is received from arm 66 by a connecting rod 124, bell crank 125 and a link 126 which engages a cross head 127 depending from plate 123. This cross head is fast on a pair of parallel rods 128, extending longitudinally beneath the platform, and slidable in brackets 121. By this construction the plate will receive its guide from rods 128, which will effectively hold it to its true course. To platform 120 are hinged at 129 a pair of stops or latches 130 which are adapted to engage the back of the pamphlet. These stops are influenced by springs 131 that tend to throw them upward, the stops in such position, presenting an inclined surface to the pamphlet descending through the table slot. To shelf 119 there is secured by hinge leaf 132 a pivoted hook stop 133 having a slanting beak and adapted to engage the front of the pamphlet. In order to permit the hook to grasp pamphlets of different heights, the leaf 132 is adjustably secured to shelf 119 by means of a binding screw 134, that passes through an elongated slot of the leaf. When a pamphlet has descended upon platform 120 it will arrive between the plate 123 on the one hand, and the stops 130, 133 on the other hand. The plate will now advance, taking the pamphlet along with it, and causing the latter to depress stops 130, and raise stop 133, so that the pamphlet will pass a short distance beyond the stops, and push back the stack of pamphlets that have already accumulated. The stops will be returned to their normal or protruding position as soon as they have been cleared by the pamphlet, thereby holding the pamphlet last arrived in place, and thus packing the entire stack. After a pamphlet has been shoved against the pack in the manner described, the plate will return to its receiving point, its return movement being unimpeded by the stops. This is so for the reason that the bottom edge of the plate projects a distance above the maximum elevation of stops 130, while stop 133, is accommodated by a corresponding opening 135 of the plate. It may be remarked that the receiving platform 26 as well as the delivery platform 120, may be made of very considerable length, so that the machine will run for a "long" period of time, without requiring the attention of the operators.

The machine constructed as described is well adapted for meeting the requirements of printers and book binders, and more particularly of those who are called upon to manufacture pamphlets and magazines in small as well as in large quantities with accuracy and despatch. By pasting and scoring the pamphlet along its sides at a short distance from the back, the cover will hinge on the body of the pamphlet, instead of at the back and be thus relieved of any strain that would tend to separate it more particularly at the corners, so that in this way, an output of superior covering is produced.

I claim:

1. A pamphlet coverer comprising a table, a runway on the table, means for feeding a cover into the end of the runway, and means for feeding a pamphlet-body into the side of the runway.

2. A pamphlet coverer comprising a table, a runway on the table, a pamphlet-body receiving platform communicating with the side of said runway, and elevated a distance above the table and means for feeding a pamphlet cover into the end of the runway beneath the platform.

3. A pamphlet coverer comprising a table, a pair of side pieces on the table that form a runway therebetween, a platform, and pamphlet-body feeding means on said platform that extend entirely across the runway and are adapted to carry the pamphlet-body sidewise into the same.

4. A pamphlet coverer, comprising a table, a pair of side pieces on the table that form a runway therebetween, a transverse platform that clears one of said side pieces and extends across the runway, and endless conveyer chains carried by the platform, extending likewise across the runway.

5. A pamphlet coverer comprising a table, a pair of side pieces on the table that form a runway therebetween, a transverse platform that clears one of the side pieces and extends across the runway, pamphlet conveying means carried by the platform and extending likewise across the runway, said platform being elevated a distance above the table, to form a cover receiving space between the table and platform.

6. A pamphlet coverer comprising a table, a pair of side pieces on the table that form a runway therebetween, a platform that extends transversely across the table and the runway, and pamphlet body feeding means carried by the platform, the platform being raised a distance above the table, and having a downward inclination from its receiving end toward its delivery end.

7. A pamphlet coverer comprising a table, a pair of side pieces on the table that form a runway therebetween, a transverse platform that communicates with the runway and has a dip from its receiving end toward the runway and means for feeding a cover into the end of the runway.

8. A pamphlet coverer comprising a table, a pair of side pieces on the table that form a runway therebetween, a transverse platform that communicates with the runway and has a dip from its receiving end toward the runway, and endless conveyer chains extending along the platform and traversing the runway.

9. A pamphlet coverer comprising a table, a runway extending along the same, means for feeding pamphlet bodies into the side of the runway, means for feeding covers into the end of the runway beneath the pamphlet bodies, a bridge in the runway, said bridge having a raised section, means for feeding the covers along the runway upon said raised section, and means for feeding the pamphlet bodies along the runway likewise upon said raised section whereby they are brought into engagement with the covers.

10. A pamphlet coverer comprising a table, a runway extending along the same, said runway being adapted for the reception of covers and of pamphlet bodies, means for turning the covers toward the bodies, and means for pressing the covers against the sides of the bodies, for some distance beyond the backs of the pamphlets and covers.

11. A pamphlet coverer comprising a table, a pair of open side pieces extending along the same and forming a runway therebetween, said runway being adapted for the reception of pamphlet bodies and of pamphlet covers, that project with their sides through the open side pieces, means for feeding the bodies along the runway, means located sidewise of the runway for turning the covers toward the side pieces and pamphlet bodies, and means located likewise sidewise of the runway for pressing the covers against the sides of the pamphlet bodies for some distance beyond the backs of the pamphlets and covers.

12. A pamphlet coverer comprising a table, a runway extending along the same, said runway being adapted for the reception of covers and of pamphlet bodies, means for turning the covers toward the bodies, means for pressing the covers against the sides of the bodies, and means for scoring the covers at a distance beyond the backs of the covers.

13. A pamphlet coverer comprising a table, a runway extending along the same, said runway being adapted for the reception of pamphlet bodies and of covers, means for feeding the bodies along the runway, and means located sidewise of the runway for simultaneously forcing the backs of the pamphlet bodies downwardly against the backs of the covers.

14. A pamphlet coverer comprising a table, a runway extending along the same, said runway being adapted for the reception of pamphlet bodies and of covers, means for turning the covers toward the bodies, means for pressing the covers against the sides of the bodies, means for scoring the covers at a distance beyond the backs of the covers, and means for forcing the backs of the pamphlet bodies downwardly against the backs of the covers.

15. A pamphlet coverer comprising a table, a runway extending along the same, said runway being adapted for the reception of pamphlet bodies and of covers, folders at the sides of the runway for turning the covers toward the pamphlet bodies, and a plurality of pressure rollers likewise at the sides of the runway, and adapted to engage the sides of the covers along the backs thereof.

16. A pamphlet coverer comprising a table, a runway extending along the same, said runway being adapted for the reception of pamphlet bodies and of covers, folders at the sides of the runway and scoring rollers likewise at the sides of the runway and adapted to score the sides of the covers at a distance beyond the backs thereof.

17. A pamphlet coverer comprising a table, a runway extending along the same and adapted for the reception of pamphlet bodies and covers, and folders, pressure rollers and flanged scoring rollers arranged at both sides of the runway, and adapted to engage the sides of the covers to the right and left of the backs thereof.

18. A pamphlet coverer comprising a table, a runway extending along the same and adapted for the reception of pamphlet bodies and covers, means for forcing the covers against the sides of the pamphlet bodies, and a plurality of depressing rollers arranged at one side of the runway and turning on inclined axes, said depressing rollers being adapted to force the backs of the pamphlet bodies against the backs of the covers.

HORACE L. ROBERTS.